United States Patent [19]

Freeman et al.

[11] 3,714,590
[45] Jan. 30, 1973

[54] AVERAGING CIRCUIT

[75] Inventors: Francis R. Freeman; Joseph D. Vitali, both of Tulsa, Okla.

[73] Assignee: Amoco Production Company, Tulsa, Okla.

[22] Filed: Nov. 8, 1971

[21] Appl. No.: 196,296

[52] U.S. Cl. ............328/158, 328/104, 330/86, 235/154, 340/347 AD, 340/347 DA
[51] Int. Cl. ...........................G06g 7/00, H03f 1/34
[58] Field of Search ........328/127, 158, 104; 330/86; 235/154; 340/347 AD, 347 DA

[56] References Cited

UNITED STATES PATENTS

| | | | |
|---|---|---|---|
| 3,458,821 | 7/1969 | Clarridge | 330/86 X |
| 3,539,936 | 11/1970 | McGhee | 330/86 X |
| 3,591,785 | 7/1971 | Miller | 328/158 X |

Primary Examiner—John S. Heyman
Attorney—Paul F. Hawley

[57] ABSTRACT

A circuit is shown which has the unusual property of averaging the amplitude of a plurality of signals which have been received one after the other, regardless of the length of time before the signal was received, or the fact that the signal amplitude during reception increasingly changed. The number of signals so averaged may be altered at will up to a predetermined maximum. If desired, the amplitude of each of the signals being averaged can be separately indicated.

3 Claims, 1 Drawing Figure

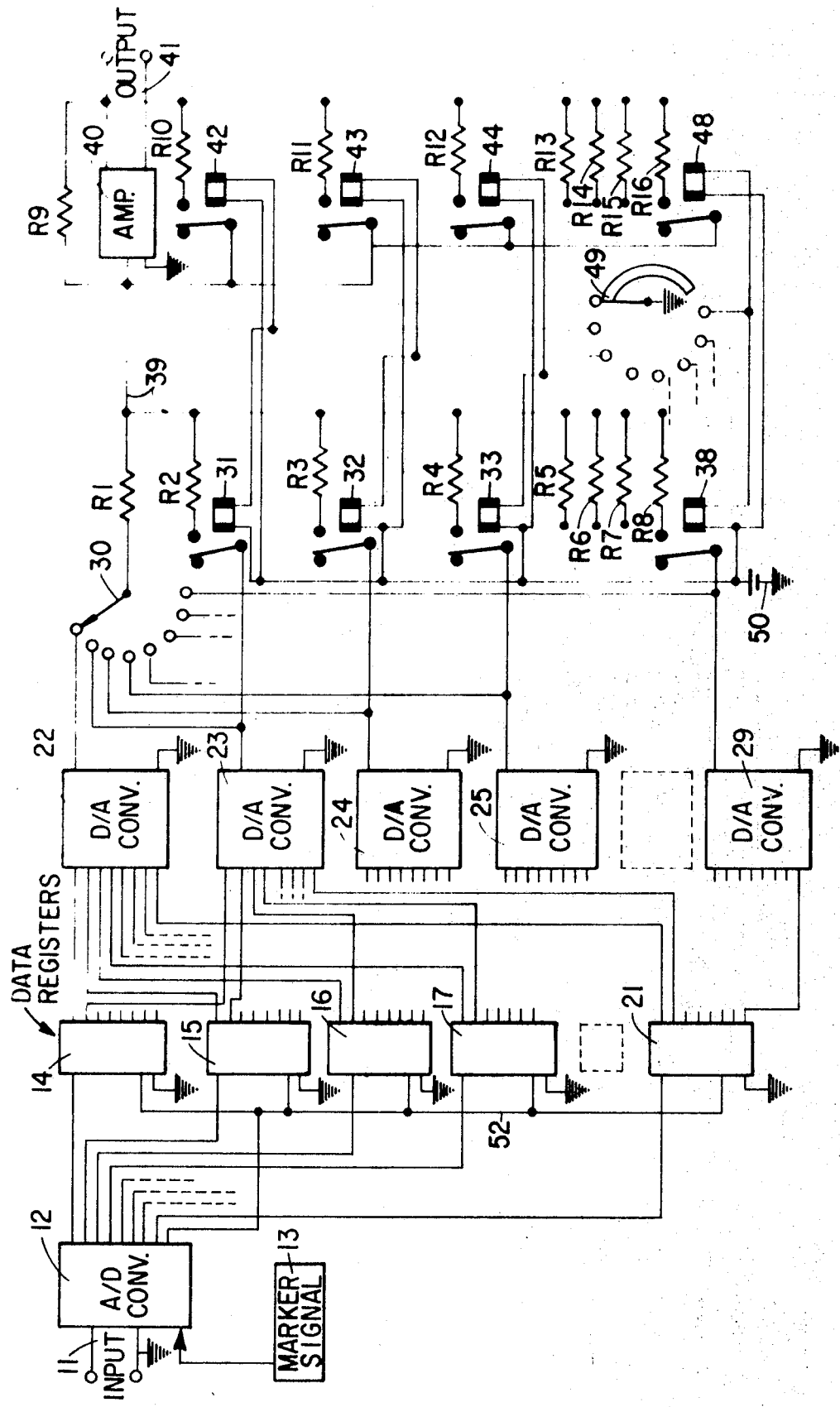

AVERAGING CIRCUIT

CROSS REFERENCE TO RELATED APPLICATION

Ser. No. 162,693 Vincent and Wilder, filed July 14, 1971 (C.I.P. of Ser. No. 874,562, filed Nov. 6, 1969, now abandoned).

BACKGROUND OF THE INVENTION

This invention grew out of the development of a drilling cost indicator, the application for which is listed above. This drilling cost indicator has proved to be of very definite advantage in improving the drilling of a well, such as an oil or gas well. The indicator is basically a small analog computer which produced, among other electrical outputs which are recorded, an electrical signal directly proportional to the incremental cost of drilling a unit length of hole, such as a foot. The operator of the drill rig has independently at his control all of the normal variables, such as the rotational speed of the drill string, the weight on the bit, the rate of flow of drilling fluid, its composition, etc. He can change these during the drilling to see whether he can decrease his drilling cost. The signal plotted is an electric analog voltage which varies in relationship to the selected variable and the time required to drill each foot, as described more completely in the above-identified Vincent-Wilder patent application.

In using the drilling cost indicator it has been found that this particular indication (incremental cost per foot) is valuable, but in the situation where it would be most useful, that is in drilling extremely tough formations, the rock properties seem to vary sufficiently so that the indication for a plurality of adjacent feet changes considerably. At times the signal may change too much to be very useful. By graphical means it was determined that a more usable signal output would be the incremental cost per foot drilled averaged over a plurality of the last feet drilled.

This presented a peculiar type of problem. The electric current being recorded changes in amplitude with time from an initial value of zero to a given maximum at the conclusion of drilling each foot. This variation with time is not necessarily linear and ordinarily is not. Each succeeding signal appears immediately after the preceding signal has ceased. Accordingly, one must average a plurality of maximum values, which occur one after the other. Duration of any one signal may vary widely. Only in an extraordinary case will these maxima appear at regular intervals of time. Under ordinary circumstances, they occur during completely random intervals.

DESCRIPTION OF THE PRIOR ART

In reviewing various averaging circuits, none was found which permitted averaging the peak values of a plurality of electrical signals occurring in time sequence. The type of art found is characterized by the Schuster U.S. Pat. No. 3,404,351. In other words, such circuits average a plurality of simultaneously occurring signals. In fact, as shown in Schuster, they average the simultaneous value of signals which vary only relatively slowly with time. In the Schuster circuit, as shown in FIG. 3, the signals are added together by connecting the voltage sources together through essentially identical resistors of high ohmic value and grounding the common point through a resistor of value low compared to that of any of the first resistors. Incidentally, the first resistors are called "add resistors". The voltage across the last resistor is directly proportional to the sum of the simultaneous voltages of the sources and therefore can be considered to be an average.

Schuster goes further in that he devised a circuit (see his FIG. 6) in which a comparison is made of the relative amplitude of the various simultaneous voltages to be averaged, and if one of the plurality (in his case, one of the three) differs markedly from the others, a gate automatically opens that particular circuit so that no current is contributed to the averaging resistor through that particular add resistor. At the same time the value of the gain of the amplifier is automatically decreased one-third so that the output appears on the same scale as when three voltages were being averaged.

Such a circuit cannot be applied to the problem of averaging the peak values of a plurality of electric signals of completely arbitrary time-amplitude variation occurring one after the other. The mere fact that such signals are not occurring simultaneously indicates that a circuit of the form shown in Schuster (or as a matter of fact, any of the other analog addition circuits found of either series or parallel type) cannot be used.

SUMMARY OF THE INVENTION

The circuit used in this invention is a combination digital and analog circuit for averaging the value of any desired plurality of electric signals (up to a predetermined maximum) which occur in sequence. Each varying signal in turn is fed to the input of an analog-to-digital converter which converts the amplitude to a plurality of bits. Each bit is separately placed in one of a plurality of data registers, the number of which corresponds to the maximum bits obtainable from the analog-to-digital converter. A separate "marker signal" indicating the end of the variable input signal is generated in external circuitry and applied to the start terminal of the converter. The status signal from the converter is applied in parallel to the shift command terminals of the plurality of shift registers so that the bits stored in the data register (representing the value of the varying input signal during one occurrence) are shifted automatically to the next position in the register each time a new signal is presented to the input of the converter. One set of outputs from the shift registers is connected to one digital-to-analog converter, the next set from the shift registers to a second digital-to-analog converter, and so on. The number of digital-to-analog converters is equal to the maximum number of signals to be averaged. The output terminals of a desired number of the digital-to-analog converters are connected through summing resistors to an operational amplifier, with feedback resistors which are related in value to the summing resistors. The summing and averaging resistor pairs are selected by relays, which are remotely preset to the desired number of signals to be averaged. Thus the output of this amplifier is directly proportional to the sum of the amplitudes and represents the average of the amplitudes of these signals. This output may be indicated or recorded (or both) as desired. The number of signals averaged can be very rapidly changed.

BRIEF DESCRIPTION OF THE DRAWING

The drawing represents partly in circuit form and partly in block diagram form the connections of the various pieces of electric equipment which produce the operating circuit described above.

DESCRIPTION OF THE PREFERRED EMBODIMENT

Each varying electric signal is presented in turn to the input terminals 11 of the analog-to-digital converter 12. The marker signal representing conclusion of one electric signal and the start of the next is separately generated in a generator 13. This generator 13 does not form a part of this invention. For reference, the marker signal may be generated in an apparatus of the type described in U.S. application Ser. No. 162,693 of Vincent and Wilder previously referred to, being the signal from terminals 11 in FIG. 2 of that application. This signal is generated each time the drill bit drills an additional foot, or unit of depth. The input to terminals 11 in this case would be those applied to the input of recorder 64 in FIG. 5 of that application.

The analog-to-digital converter 12 has a plurality of output terminals for the various bits into which the input signal amplitude has been converted. (An 8-bit converter is quite satisfactory.) Each of these terminals is connected to one input terminal of an individual data register. This data register is a shift register containing sufficient storage capacity to correspond numerically to the maximum number of samples to be averaged. The number of data registers is equal to the number of bit terminals in digital-to-analog converter 12. Thus, in the FIGURE there would be eight of these data registers, but for convenience in drawing only five have been shown, numbered 14-21.

The analog-to-digital converter 12 also has a so-called status terminal which is connected in parallel to the shift right terminals of all of the data registers. In operation, a pulse is generated by the marker signal generator 13 and applied to the converter 12. The electric signal present at this instant across terminals 11 of the converter is at that instant converted into a digital form representing this amplitude. After a short delay, a pulse is put out at the status terminal connected to line 52 which is connected to the shift right terminals. Accordingly, at the occurrence of this pulse the signals on the data registers 14 similarly are moved down one level in these registers.

Thus with this arrangement, the bits of digital data equivalent to the signal on terminals 11 at the time the pulse is generated by the marker generator 13 appear at the outputs of the converter 12. The most significant bit is stored in register 14, the next most significant in register 15, and so on until the eighth bit is stored in register 21. The data are loaded into each of the 8-bit shift registers in serial format, and are presented at the outputs of the shift registers in parallel format. At the end of the data conversion time for each foot marker signal received, a pulse is generated at the status terminal of converter 12 which goes by line 52 to the appropriate terminals of all the data registers 14 to 21 and causes these registers to shift right, placing the data corresponding to the signal just completed into the second register position in each of the registers 14 to 21. This leaves the first register position in each register open to receive the new data from the converter 12 representing the next input signal (in this case the cost appropriate to drilling the next foot of formation). It can be seen that as the sequence continues of presenting serially in turn the input cost-per-foot data, the registers contain the data for the most recent eight feet of drilling. Each register is dedicated to a single bit, thus register 14 is dedicated only to bit 1 for the most recent 8 feet of drilling, and register 21 to the eighth bit of the corresponding eight feet of drilling.

The corresponding output terminals of all the data registers 14 to 21 are connected to the appropriate bit input terminals of the digital-to-analog converters 22 to 29. Thus the first terminal of data register 14 is connected to the bit-1 terminal of converter 22, the corresponding top terminal of register 15 is connected to the bit-2 terminal of converter 22, and so on. There are as many digital-to-analog converters as the maximum number of data to be averaged. Thus, if there are eight converters, eight samples can be averaged. The second terminals on registers 14 to 21 are separately connected to the appropriate bit terminals of converter 23, the third to the appropriate bit terminals of converter 24, and following. Many conductors have been omitted in the FIGURE, but the above description gives the actual connection.

The function of the single-pole, multiple-throw switch 30 will be temporarily omitted (for discussion below). The blade of this switch is connected to one side of add resistor $R_1$. The poles are connected in turn to the analog outputs of converters 22-29. The circuit contains a number of substantially identical resistance add resistors $R_1$ to $R_8$, equal in number to the number of digital-to-analog converters 22-29. The output of converter 23 is connected to a normally open contact on a relay 31, the other contact of which is connected to one side of add resistor $R_2$. Similarly, the output terminal of the converter 24 is connected through the switching contacts of relay 32 to one side of add resistor $R_3$, the output of converter 25 is connected through relay 33 to one side of add resistor $R_4$, and so on. Thus the output terminal of converter 29 is connected through the switching terminals of relay 38 to one side of add resistor $R_8$. The opposite terminals of all of these add resistors are connected together by line 39. This same point is connected to one side of an adjustable gain operational amplifier input terminal, of which the other input terminal is connected through a resistor to a ground terminal.

Preferably amplifier 40 is of the negative feedback type with sufficient negative feedback so that the gain of the amplifier is determined essentially only by the size of the feedback resistor and summing resistor. Feedback resistor $R_9$ is permanently connected to provide negative feedback to the input of amplifier 40. The input resistance of amplifier 40 is made small compared to the resistance of any of the series add resistors $R_1$ to $R_8$. Preferably it will be of the order of at most a very few percent of the ohmic value of any of these resistors. Thus the output of the converters 22-29 can be considered to be voltage sources connected through one or more add resistors to the input of an amplifier (40) of low input resistance, so that the voltage appearing across the input of amplifier 40 is directly proportional to the sum of the voltage outputs from all the digital-tooanalog converters 22–29 connected through add resistors to the amplifier.

In the position shown in the FIGURE, only add resistor $R_1$ is connected across from converter 22 to amplifier 40. Thus the output of the amplifier across terminals 41 is a signal the voltage of which is directly proportional to the amplitude of the last signal appearing on the input terminals 11. However, connected in parallel across feedback resistor $R_9$ through the switching contacts of a plurality of relays 42–48 are a plurality of substantially equal resistors $R_{10}$ to $R_{16}$ (equal to $R_9$, that is). The coils of each pair of corresponding relays 31 and 42, 32 and 43, and so on, are connected in parallel and one side of each set is connected to a point on the multi-contact shorting switch 49, the blade of which is grounded. A source of emf 50, one side of which is grounded, is connected to the other side of each of the paired sets of relay coils. Thus when switch 49 is moved one point to the left, the coils of relays 31 and 42 are energized from the source 50, thus connecting $R_2$ between the output of converter 23 and line 39, and simultaneously connecting $R_{10}$ across in parallel with $R_9$. Connecting resistor $R_{10}$ across $R_9$ halved the feedback resistor, thus halved the gain of amplifier 40. Connecting add resistor $R_2$ to the output of converter 23 produced a voltage on the input of amplifier 40 directly proportional to the sum of the voltage outputs from converters 22 and 23. Now the output on terminals 41 is directly proportional to the average of the outputs on converters 22 and 23 (that is, the sum of these voltages, divided by 2). Moving switch 49 to the third point additionally closes relays 32 and 43, thus decreasing the gain of amplifier 40 to one-third its original value, and adding a third voltage source (that of converter 24) into the circuit. The output on terminals 41 is now the average of the three outputs of converters 22–24. Further moving switch 49 to each contact point to the left increases the number of outputs from the analog side of the converters 22–29 averaged at the output 41 of the circuit. Since the maximum value of the input signals on these converters was proportional to the cost of drilling a foot of well, it is apparent that one produces at terminals 41 the average output for N of the last sets of input data and thus produces a signal proportional to the average cost for drilling those N feet, where N is any integer from 1 to a number equal to the number of digital-to-analog converters.

In some cases one wishes to compare, one at a time, the maximum values for the input data stored in the registers. This is the function of multi-contact switch 30. Providing switch 49 is in the zero position shown, manipulation of the pole of switch 30 to the second contact produces an output at terminals 41 directly proportional to the single output of digital-to-analog converter 23; moving the switch to the third point produces an output at terminals 41 directly proportional to the output of converter 24, and so on.

Accordingly, it is possible by means of the circuit shown to obtain the average of the maximum value of an adjustable number of serially-received inputs from two to eight, or to obtain to the same scale a single output directly proportional to the maximum value of a single selected input from any of these eight sets of data.

In practice this circuit has proved to work quite well. It permits the operator to have maximum flexibility in viewing individual or averaged groups, as he wishes. For the particular application discussed, the circuit was arranged so that each average included the data from the last input and those received before it in turn, up to a maximum of eight. The same principle may be employed in selecting any other average, if desired. It is only necessary to re-wire the relays (such as 31–38) so that the selected add resistors chosen can connect the desired sources into the common line 39 running to the input of amplifier 40.

As an example of equipment currently available for use in this invention, the analog-to-digital converter 12 can be a Type ADC-8H10-BNBP converter, manufactured by Pastoriza Division, Analog Devices, Inc., 221 Fifth Street, Cambridge, Mass. The data registers 14–29 each may be made of two 4-bit shift registers, Type SN7459N, made by Texas Instruments, Inc., Dallas, Tex. Each two registers are series connected to form an 8-bit shift register. The digital-to-analog converters 22–29 can be Type DAC-8H-3 converters, also made by Analog Devices, Inc. Finally, one suitable amplifier 40 is Type MC1741L(741), manufactured by Motorola Semiconductor Products, Inc., Phoenix, Ariz.

In summary, the serially-received input signals are converted to digital form and the value in this form is stored, quite irrespective of reception time, in the appropriate level of a plurality of data registers equal in number to the number of bits desired. Whenever a new signal arrives, the signal in each level of each data register is shifted to the right one level, thus ultimately passing out of the signal after the eighth level, in the example given. The data register output terminals are selectively connected, appropriate bit to appropriate bit, in each level to one of an equal number of digital-to-analog converters. This produces at the analog output of each converter a signal proportional to the amplitude of the last N input signals received (regardless of duration of this signal). A selected number, as desired, of the outputs of these digital-to-analog converters are connected through add resistors of high resistance to an adjustable gain amplifier of relatively low input resistance, the gain of the amplifier being adjusted inversely proportional to the number of active add resistors in the circuit. The output of the amplifier then is directly proportional to the average of the maximum of the data from the signals selected.

We claim:

1. A circuit for averaging a variable plurality of electric signals occurring one after the other comprising
   an analog-to-digital converter the input to which is responsive to the amplitude of each of said signals,
   a set of data registers equal in number to the desired number of bits in the output from said converter, the input to each of said set being individually connected to one output terminal of said converter,
   electric means connected to said converter for transferring each bit of the output of said converter to one of said set of data registers,
   a set of digital-to-analog converters, the inputs to each of which are connected separately to one level of the output terminals of said set of shift registers,
   means to shift data stored in the form of bits in said set of data registers by one location when the bits in said analog-to-digital converter are transferred to said set of data registers, an adjustable gain amplifier having a predetermined input resistance R, a set of substantially equal add resistors of value R' [R' being large compared to R], one side of each of which is connected to the input of said amplifier, means for connecting a desired plurality of the outputs of said set of digital-to-analog converters individually to the other end of one each of the add resistors R' while all other of said add resistors are disconnected, and means for adjusting the gain of said amplifier inversely proportional to the number of connected add resistors, whereby the output of said amplifier is a signal the amplitude of which is proportional to the average of said desired plurality of electric signals.

2. Apparatus in accordance with claim 1, in which said amplifier is of negative feedback type with the effective gain governed by the value of the feedback resistor employed, and said means for adjusting the gain of said amplifier stepwise adjusts said gain by connecting in parallel as said feedback resistor a set of substantially equal resistors of number equal to the number of electric signals being averaged.

3. Apparatus in accordance with claim 2, including switching means for connecting one of said add resistors R' to any one only of said outputs of said set of digital-to-analog converters.

* * * * *